Feb. 27, 1968  D. B. SHORE  3,370,513
POWER ASSIST CONTROL SYSTEM UTILIZING A FLUID, PILOT-OPERATED
CONTROL VALVE
Filed Oct. 5, 1965
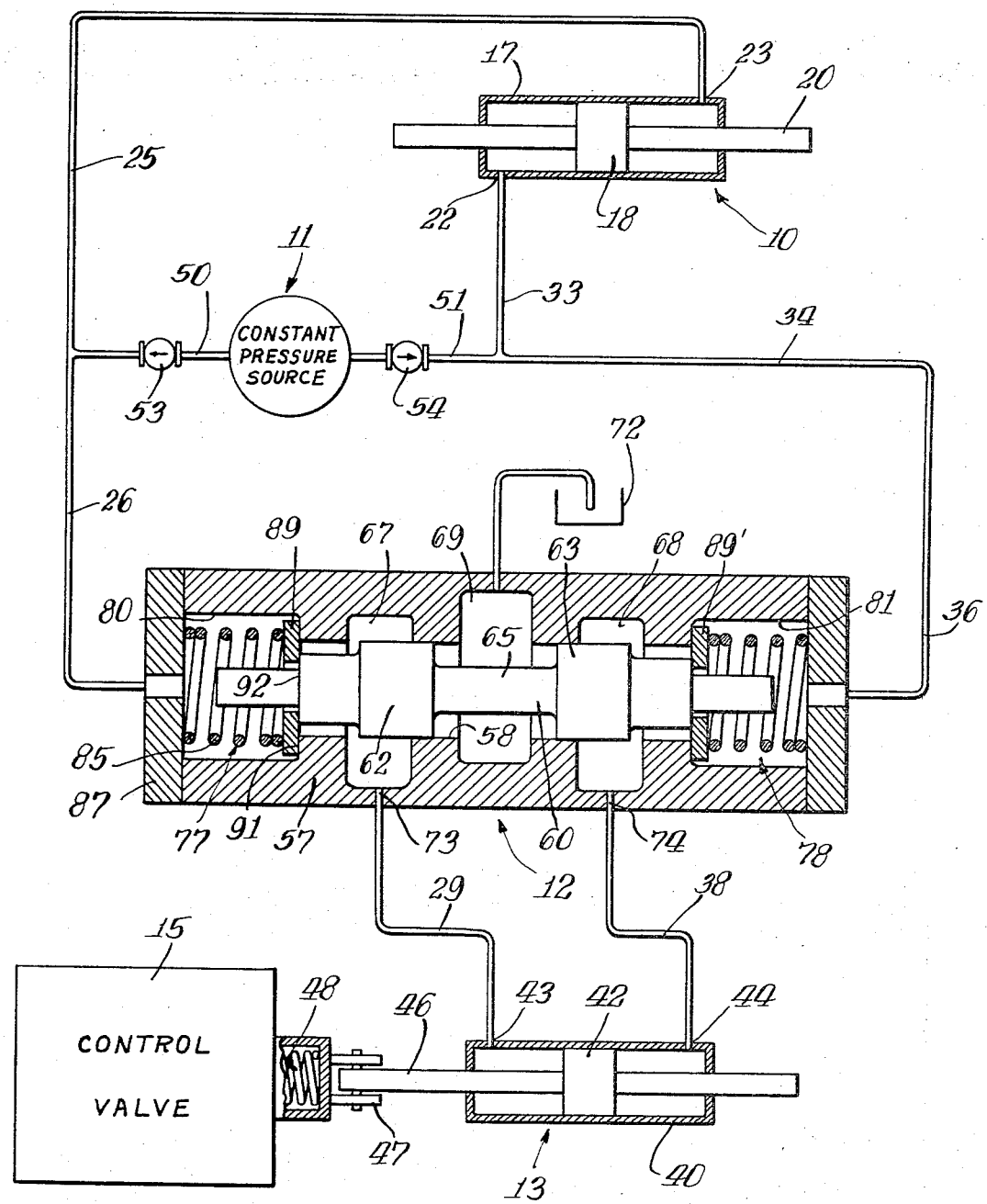
Inventor:—
Daniel B. Shore,
By Robert B. Zür
Attorney

United States Patent Office 3,370,513
Patented Feb. 27, 1968

3,370,513
POWER ASSIST CONTROL SYSTEM UTILIZING A FLUID, PILOT-OPERATED CONTROL VALVE
Daniel B. Shore, Niles, Ill., assignor to International Harvester Company, Chicago, Ill., a corporation of Delaware
Filed Oct. 5, 1965, Ser. No. 493,178
7 Claims. (Cl. 91—466)

ABSTRACT OF THE DISCLOSURE

A device for remotely providing power assistance to operate a primary control valve; which device includes a slave cylinder or actuator mechanically connected to the primary control valve, the movement of the actuator being controlled by a manually movable master cylinder which combines fluid pressure with a constant pressure source through the hydraulic operation of a directional control valve to move the actuator in either of two directions, thus activating the primary control valve.

This invention relates to hydraulic control systems and, more particularly, to a power assist system for driving a hydraulic motor, such as a reciprocable piston actuator or the like.

Prior known hydraulic power assist systems generally fall into two catagories. One includes a manually positionable valve connected to port fluid, to and from a hydraulic actuator. When the desired actuator position has been reached, it is necessary for the operator to manually shift the valve back to its blocking position. Such a system lacks any follow-up action, which is oftentimes desirable. The other prior hydraulic power system includes a manually positionable valve connected to port fluid to a hydraulic actuator with a mechanical linkage coupling the actuator or load to the valve to reposition it when the desired actuator position is achieved. Such a system necessitates oftentimes complicated mechanical feed-back linkage which renders the construction more complex and expensive, and also more difficult to attain any significant degree of remote control.

In accordance with the present invention, these prior disadvantages are, in part, overcome by providing a master manually positionable hydraulic cylinder connected to deliver fluid to an actuator with means for supplying fluid under pressure from a separate source to assist in driving the actuator. This system offers the advantages of remote control, power assist, and follow-up, without necessitating any mechanical feed-back linkage. A directional control valve is provided, responsive to pressure in the master cylinder for selectively connecting either side of the master cylinder and the power assist pressure source to either side of the actuator to achieve reversible actuator movement. Further, the directional control valve when in a neutral position, may provide communication between the master cylinder, or the pressure source, and the actuator or slave cylinder.

It is therefore, a primary object of the present invention to provide a new and improved power assist system with follow-up action without necessitating conventional feed-back devices.

A further object of the present invention is to provide a device of the character described including a manually positionable master cylinder connected to deliver fluid to either side of a slave cylinder or actuator with a valve for selectively connecting a separate pressure source to the actuator to thereby provide a force on the actuator much greater than that provided by the master cylinder alone.

Another object of the present invention is to provide a power assist system of the character described above, wherein the valve consists of a shiftable spool valve having its ends connected to either side of the master cylinder so that upon movement of the master cylinder piston in one direction, the pressure will increase on one side of the spool valve and shift it to properly connect the power assist pressure source to one side of the actuator. Upon movement of the master cylinder piston in the other direction, the pressure will increase at the other end of the spool valve and will shift it to connect the power assist pressure source to the other side of the actuator, thereby providing a reversible positioning system.

A more specific object of the present invention is to provide a new and improved power assist system including a reciprocating system hydraulic actuator, a manually controllable reciprocable master cylinder for delivering fluid to the actuator to position it according to the extent of movement of the piston in the master cylinder; with a power assist device for assisting movement of the actuator piston including a constant pressure source of hydraulic fluid adapted to assist the master cylinder in positioning the actuator, and a directional control spool valve for selectively supplying the source and master cylinder fluid pressure to the actuator, the spool valve being shiftable and being responsive to pressure in the master cylinder so that movement of the master piston in one direction causes the spool valve to shift in one direction, and movement of the master piston in the other direction causes movement of the spool valve in the other direction, thereby to provide a symmetrical output from the system, and further including neutral spring means for biasing the spool valve to a neutral position, where the valve connects both sides of the master cylinder to both sides of the actuator or slave, the constant pressure source having a sufficient pressure to exert a force on the actuator slightly less than necessary for movement of the load so that the incremental additional increase in pressure caused by movement of the master cylinder piston will produce the power assisted movement of the actuator and the load.

Other features and advantages of the invention will be apparent from the following description taken in connection with the accompanying drawing which is a schematic illustration of a power assist system incorporating the principles of the present invention.

Referring now to the drawing, the present power assist system is seen to consist generally of a master cylinder 10, a constant pressure source 11, a directional control valve 12, and a slave cylinder or actuator 13 connected to drive a load such as flow control valve 15. The master cylinder 10 is adapted to deliver fluid to the slave cylinder 13 and position the control valve 15 according to the extent of movement of a manually controlled piston 18 in the master cylinder 10.

The master cylinder 10 is a reciprocating piston device of the positive displacement type, and includes a cylinder 17, with a reciprocable piston 18 slidable therein. Connected to the piston 18 is a rod 20, which extends from the cylinder 17. A suitable manual control linkage (not shown) is connected to the rod 20, so that the piston 18 is manually positionable. The cylinder 17 has ports 22 and 23, for conveying fluid to and from the cylinder. As the piston is moved to the right, as shown in the drawing, hydraulic fluid is forced out port 23 through conduit 25, conduit 26, through valve 12, and thence through passage 29 to the left side of the actuator 13. Similarly, upon movement of the rod 20 to the left, piston 18 forces fluid out port 22, through conduit 33, conduit 34, conduit 36, through directional control valve 12, and thence through passage 38 to the right side of the slave cylinder 13.

The slave cylinder or actuator 13 is also of the reciprocating piston type, including a cylinder 40 with a piston 42 slidable therein. The cylinder 40 has ports 43 and 44 therein, connected respectively to passages 29 and 38. Connected to the piston 42 is a rod 46, one end of which is connected by a suitable fitting 47 to a movable valve member in control valve 15. The control valve 15 is constantly urged in one direction by a spring 48.

The constant pressure source 11 provides hydraulic fluid under a constant pressure for the system, and is connected to assist movement of the actuator 13, and also to fill the expanding side of the master cylinder 17 as will appear hereinafter. Suitable conduits 50 and 51 connect the pressure source with conduits 25 and 33, respectively, so that the pressures in lines 25 and 36 are the sum of the pressure caused by movement of the piston 18 and the constant pressure source 11. The pressure of source 11 is selected so that it is, by itself, slightly less than necessary to initiate movement of piston 42. In this manner, a small additional force on piston 42 caused by movement of master cylinder piston 18 produces movement of the actuator piston 42 and the load.

Suitable check valves 53 and 54 in lines 50 and 51, respectively, prevent flow from conduits 25 and 33 to the constant pressure source.

The directional control spool valve 12 is provided for selectively connecting the flow from the master cylinder 10 and the constant pressure source, to the sides of the actuator 13, to achieve a symmetrical output from the system. The valve 12 is seen to consist of a casing 57, having a central bore 58 therein. Bore 58 slidably receives a spool member 60 having raised lands 62 and 63, separated by reduced central stem portion 65. Grooves 67 and 68 define input ports to the valve 12, and are connected respectively to conduits 26 and 36. More specifically, port 67 communicates with conduit 26 around land 62, through bore 58, around collar 89, and through a bore 80 in valve housing 57 which communicates with conduit 26. Port 68 communicates with conduit 36 in a similar fashion around the right collar 89'. The collars 89 and 89' are constructed so that they do not substantially restrict flow between the bores 80, 81 and the bore 58. The centrally disposed recess 69 in the casing 57 defines an exhaust passage which communicates with a suitable tank 72. Ports 73 and 74 in the lower portion of casing 57 are connected respectively to actuator passages 29 and 38, and which are selectively connected with the conduits 26, 36, or the exhaust groove 69.

The spool member 60 is biased to its neutral position shown in the drawing by spring assemblies 77 and 78 seated in counter-bores 80 and 81 in the ends of casing 57. Each spring assembly includes a coil spring 85 seated at one end on a valve closure member 87, and at its other end against annular collars 89 or 89'. In the neutral position, collar 89 engages a shoulder 91 in the casing 57 and a shoulder 92 on the spool member 60. Upon movement of the spool to the left, shoulder 92 will move collar 89 away from the casing shoulder 91 against the biasing force of spring 85. This occurs upon a pressure differential in bores 80 and 81 as will appear hereinafter.

When in the neutral position shown, the spool member 60 permits communication between the bores 80, 81 and the actuator ports 43 and 44 around lands 62 and 63, respectively. If the spool member 60 is shifted to the right, communication between bore 80 and valve port 73 continues, while valve port 74 communicates with tank 72 through exhaust passage 69. At the same time land 63 blocks communication between bore 81 and port 74. When the valve is moved to the left, bore 81 communicates with port 74, while port 73 communicates with the tank through exhaust passage 69. Thus, the spool valve selectively connects one side of actuator piston 42 to supply pressure, and the other side of the piston to tank when the valve is shifted from its neutral position. When in neutral, both sides of piston 42 are subjected to supply pressure.

The spool member 60 is responsive to a pressure differential across piston 18. More specifically, port 22 communicates with the bore 81 through conduit 36 while port 23 communicates with bore 80. The springs 85 are designed so that upon initial movement of the master piston 18 in one direction, with the resulting pressure differential in bores 80 and 81, that one of the springs will yield, providing a shifting movement of the spool member 60.

In operation with the master rod at rest, the pressure at ports 22 and 23 and conduits 26 and 36 are substantially equal so that spool valve member 60 is in its neutral position shown in the drawing. At this time, both sides of the actuator piston 42 communicate with the constant pressure source 11 through passages 26, 29 and 36, 38. Assuming, for example, that the operator manually moves the rod 20 to the left as shown in the drawing. This produces an increase in the pressure on the left side of the master cylinder 17, and a decrease in pressure in the right side thereof. This pressure differential is transmitted to the valve bores 80 and 81 through conduits 26 and 36, shifting the spool member 60 to the left. The pressure increase in lines 33 and 34 keeps the check valve 54 closed. The fluid which is displaced out port 22 flows into bore 81. Conversely, the fluid that is displaced from bore 80 flows through conduit 25 to the right side of master cylinder 17. At this time, the slave cylinder or actuator 13 will not respond to this initial pressure increase as its demands are not met thereby.

After the spool valve 60 is shifted to the left, the right side of actuator piston 42, continues to communicate with the constant pressure source 11 and the left side of master cylinder 17 through passage 38, port 74, and conduit 36. Also the left side of slave cylinder 13 communicates with tank through passage 29, port 73, and exhaust passage 69. At this time, the force applied at the slave cylinder 13 should be slightly less than that required to cause shifting movement of the actuator rod 46 and the load control valve 15. Additional movement of the rod 20 to the left by the operator increases the pressure on the right side of the piston 42 sufficiently to overcome the spring resistance in the load control valve 15.

As the master piston 18 and the slave piston 42 simultaneously shift to the left, the right side of master cylinder 17 is filled by pressure from the source 11 through check valve 53 and conduit 25. At the same time, the left side of actuator cylinder 40 exhausts to tank 72. Upon release of the master rod 20 by the operator, the pressure in conduits 26 and 36 will approximately equalize so that the spool member 60 will be shifted to its neutral position by its centering springs 77 and 78. As a result of this, the pressure in the passages 29 and 38 tend to equalize as does pressure across slave cylinder piston 42. The force of spring 48 then tends to return the actuator piston 42 to the right, driving the master piston 18 back to the right also.

If the rod 20 is manually shifted to the right by the operator, spool member 60 will also shift to the right so that the left side of actuator piston 42 communicates with the power assist pressure source 11 and the right side of master cylinder 17, while the right side of actuator cylinder 40 communicates with tank 72. In this manner the slave rod 46 will follow movement of the master rod 20 to the right in a similar manner to that described above with respect to the left-hand movement. It should be noted that the slave piston 42 will accurately follow movement of the master piston 18, and that when the master piston is stopped and held in that position, the slave piston 42 will also stop so that the control valve 15 may be remotely positioned as desired.

I claim:

1. In a power assist system, the combination comprising: a fluid driven movable actuator having first and second ports for receiving fluid to drive the actuator in forward and reverse directions; a manually movable positive displacement device for delivering fluid to said actuator ports in proportion to the extent of movement of the displacement device, said displacement device having a first displacement port communicable with said first actuator port and a second displacement port communicable with said second actuator port; a source of fluid under pressure; valve means for preventing return flow of fluid from said displacement ports to said source whenever the pressure at said ports is greater than the source pressure; and a shiftable control valve hydraulically communicating the displacement device ports and the pressure source with said actuator ports, said valve being responsive to an increase in fluid pressure in one of said displacement device ports.

2. In a power assist system as defined in claim 1, including passage means connecting said pressure source to both of said displacement device ports so that when fluid is flowing from one of the displacement device ports, the pressure source will deliver fluid to the other of said device ports.

3. In a power assist system as defined in claim 1, wherein said fluid pressure source is constructed to deliver fluid under constant pressure.

4. In a power assist system as defined in claim 1, wherein said positive displacement device includes a reciprocating piston hydraulic cylinder, and said actuator includes a reciprocating piston hydraulic cylinder.

5. In a power assist system as defined in claim 1, wherein said control valve includes a movable spool member, said member being shiftable from a neutral position to forward and reverse positions on either side of neutral, said control valve in the neutral position providing communication between said first displacement device port and said first actuator port and between said second displacement device port and said second actuator port, said control valve in the forward position providing communication of said first displacement device port and said pressure source with said first actuator port, and providing communication of said second actuator port with a drain whereby the actuator moves in a forward direction, said control valve in the reverse position providing communication of said second displacement device port and said pressure source with said second actuator port, and providing communication of said first actuator port with said drain, whereby the actuator moves in the other direction; and means for shifting said control valve to the forward and reverse positions including conduit means connecting said first displacement device port to one end of said control valve, and conduit means connecting said second displacement device port to the other end of said control valve.

6. In a power assist system as defined in claim 5, and further including means biasing said actuator continuously in one direction so that when said manually movable positive displacement device is released the control valve will return to a neutral position and fluid will flow from one of said actuator ports to one of said displacement device ports and from the other of said displacement device ports to the other of said actuator ports whereby the actuator and the displacement device are returned to a starting position.

7. In a power assist system, the combination comprising: a reciprocating piston hydraulic actuator having first and second ports adapted to deliver fluid to and return fluid from the actuator; spring means for biasing said actuator piston in one direction; a manually controllable reciprocable piston master cylinder, said master cylinder having first and second ports; means connecting said first and second master cylinder ports with said first and second actuator ports so that movement of said master piston produces proportional movement of said hydraulic actuator piston; and power means for movement of said actuator piston including a constant pressure source of hydraulic fluid, passage means connecting said source to each of said connecting means between said master cylinder ports and said actuator cylinder ports; valve means for preventing fluid flow from said master cylinder ports to said source whenever the pressure at said ports is greater than the source pressure; control valve means for selectively applying said source fluid pressure to said actuator cylinder ports, said valve including a movable spool member shiftable in one direction to connect the passage means associated with one of said master cylinder ports to one of said actuator cylinder ports and the other of said actuator cylinder ports to drain, and shiftable in the other direction to connect the passage associated with the other of said master cylinder ports with the other actuator cylinder port and the one actuator cylinder port to drain, neutral spring means biasing said valve to a neutral position, said spool valve in the neutral position connecting said first and second master cylinder ports to said first and second actuator cylinder ports; passage means connecting each end of said spool valve to one of said first and second master cylinder ports whereby the valve is shifted in response to the initial movement of the master piston; said constant pressure source having a sufficient pressure to exert a force on the actuator slightly less than necessary for movement of the actuator so that an additional increase in pressure caused by the master cylinder will produce movement of the actuator.

References Cited
UNITED STATES PATENTS

| | | | |
|---|---|---|---|
| 2,392,471 | 1/1946 | Fox | 60—51 |
| 2,691,964 | 10/1954 | Stickney | 91—466 |
| 2,729,242 | 1/1956 | Olson | 91—446 |
| 2,816,420 | 12/1957 | Walsh | 131—625.66 |
| 2,924,200 | 2/1960 | Hanna et al. | 91—51 |
| 2,970,575 | 2/1961 | Stern | 91—51 |
| 2,976,852 | 3/1961 | Goldring | 91—51 |
| 3,100,508 | 8/1963 | Mercier | 137—625.66 |
| 3,160,071 | 12/1964 | Kandelman | 91—51 |
| 3,200,845 | 8/1965 | Nakazima et al. | 137—625.6 |
| 3,237,411 | 3/1966 | Taft | 60—54.5 |
| 3,240,019 | 3/1966 | Gordon et al. | 60—54.5 |
| 3,257,811 | 6/1966 | Aiki | 60—54.5 |
| 3,304,953 | 2/1967 | Wickline | 137—625.6 |

MARTIN P. SCHWADRON, *Primary Examiner.*

EDGAR W. GEOGHEGAN, *Examiner.*

B. L. ADAMS, *Assistant Examiner.*